United States Patent
Beckedahl et al.

(10) Patent No.: US 10,090,774 B1
(45) Date of Patent: Oct. 2, 2018

(54) POWER ELECTRONIC ARRANGEMENT WITH DC VOLTAGE CONNECTION ELEMENT

(71) Applicant: SEMIKRON ELEKTRONIK GMBH & CO. KG, Nuremberg (DE)

(72) Inventors: Peter Beckedahl, Oberasbach (DE); Ingo Bogen, Nuremberg (DE); Jürgen Steger, Hiltpoltstein (DE); Alexander Wehner, Nuremberg (DE)

(73) Assignee: SEMIKRON ELEKTRONIK GmbH & CO. KG, Nuremberg (DE)

( * ) Notice: Subject to any disclaimer, the term of this patent is extended or adjusted under 35 U.S.C. 154(b) by 0 days.

(21) Appl. No.: 15/908,091

(22) Filed: Feb. 28, 2018

(30) Foreign Application Priority Data

May 5, 2017 (DE) .......................... 10 2017 109 706

(51) Int. Cl.
*H02M 7/00* (2006.01)
*H02M 7/483* (2007.01)
*H02M 7/537* (2006.01)

(52) U.S. Cl.
CPC ........... *H02M 7/003* (2013.01); *H02M 7/483* (2013.01); *H02M 7/537* (2013.01)

(58) Field of Classification Search
CPC .... H01L 25/112; H01L 25/115; H02M 7/003; H05K 1/145; H05K 1/183; H05K 1/185; H05K 7/005; H05K 7/02
See application file for complete search history.

(56) References Cited

U.S. PATENT DOCUMENTS 9,413,114 B2 * 8/2016 Yamkovoy ........... H01R 13/652

FOREIGN PATENT DOCUMENTS

DE    10 2009 043 181    4/2011

OTHER PUBLICATIONS

DE 10 2017 109 706.6, Examination Report dated Nov. 11, 2017, 4 pages—German, 2 pages—English.

* cited by examiner

Primary Examiner — Adolf Berhane
Assistant Examiner — Afework Demisse
(74) Attorney, Agent, or Firm — Lackenbach Siegel, LLP; Andrew F. Young

(57) ABSTRACT

A power electronic arrangement has a power converter module, and a first and a second DC voltage terminal element and a first and a second DC voltage connection element, connected to conductor tracks in an electrically conductive manner with the correct polarity. First and second DC voltage terminal element, and the first and second DC voltage connection element, form a stack with an insulation device therebetween. The first DC voltage terminal element has a first recess enclosed in a first main plane, the second DC voltage connection element has a second recess enclosed and aligned with the first in a third main plane, the second DC voltage terminal element and the first DC voltage connection element are in a second main plane between the first and third main plane, and are laterally spaced from each other proximate the recesses. A clamping device is electrically isolated through the first and second recess and forms an electrically conducting clamped connection between the first DC terminal element and the first DC connection element, and between the second DC terminal element and the second DC connection element.

12 Claims, 3 Drawing Sheets

POWER ELECTRONIC ARRANGEMENT WITH DC VOLTAGE CONNECTION ELEMENT

CROSS REFERENCE TO RELATED APPLICATIONS

This application relates to, and claims priority from, DE Ser. No. DE 10 2017 109 706.6 filed May 5, 2017, the entire contents of which are incorporated herein by reference.

FIGURE SELECTED FOR PUBLICATION

FIG. 4

BACKGROUND OF THE INVENTION

Field of the Invention

The present invention relates to a power-electronic arrangement with a power converter module. More particularly, the present invention relates to a power-electronic arrangement which has a switching device with a substrate.

Description of the Related Art

Industrial applications of power-electronic arrangement generally are shown in DE 10 2009 043 181 A1, which provides a power converter arrangement having a plurality of power converter assemblies with a cooling device, with power semiconductor modules and with one capacitor device per current converter assembly. In this case the power semiconductor module is arranged adjacent to the capacitor device. The DC load terminal elements of the power semiconductor module are connected by means of a planar busbar to the capacitor device, wherein the planar busbar is formed from a first and second metal shaped body with an insulating intermediate layer and this covers the capacitor device in at least one orientation. The busbars of two adjacent power converter assemblies can be connected to each other in a low-inductance manner by the first metal shaped bodies being connected using a first connection body and first connection means and by the second metal shaped bodies being connected using a second connection body and second connection means. The first connection body is additionally covered by the second connection body.

Accordingly, there is a need for an improved arrangement and better reliability.

ASPECTS AND SUMMARY OF THE INVENTION

In response, it is now recognized that there is a need to address at least one of the details noted above.

According to one alternative aspect of the present invention, there is provided a power-electronic arrangement with a power converter module, which has a switching device with a substrate with a first and a second DC voltage conductor track and a first and a second DC voltage connection element connected to said conductor tracks in an electrically conductive manner with the correct polarity, and having a housing and a first and a second DC voltage connection element, each of which is connected with the correct polarity and in an electrically conductive manner to the associated DC voltage connection element. The DC voltage connection elements preferably form the connection to a capacitor device, which are designed as intermediate circuit capacitors for the power converter module.

According to another alternative aspect of the present invention, there is provided a power electronic arrangement with a power converter module, with a first and a second DC voltage terminal element and a first and a second DC voltage connection element, connected to said conductor tracks in an electrically conductive manner with the correct polarity, wherein always the first and second DC voltage terminal element, as well as the first and second DC voltage connection element, form a stack with an insulation device in each case arranged between them, the first DC voltage terminal element has a first recess enclosed thereby in a first main plane, the second DC voltage connection element has a second recess enclosed thereby and aligned with the first in a third main plane, the second DC voltage terminal element and the first DC voltage connection element are arranged in a second main plane, arranged between the first and third main plane, and are laterally spaced apart from each other in the region of the recesses. In the arrangement a clamping device extends in an electrically isolated manner through the first and second recess, thus forming an electrically conducting clamped connection between the first DC voltage terminal element and the first DC voltage connection element, and between the second DC voltage terminal element and the second DC voltage connection element.

According to another aspect of the present invention, the object of the invention is to present a power electronic arrangement with a power converter module, wherein the connection of DC voltage terminal elements of the power converter module to DC voltage connection elements for the external connection of the power converter module is implemented with low inductance and can be simply mechanically implemented. This connection preferably has further advantages, such as strain relief.

This alternative object is achieved according to the invention by means of a power electronic arrangement having the features as noted below.

The power-electronic arrangement, according to the invention is designed with a power converter module, which has a switching device with a substrate with a first and a second DC voltage conductor track and a first and a second DC voltage terminal element connected to said conductor tracks in an electrically conductive manner with the correct polarity, and having a housing and a first and a second DC voltage connection element, each of which is connected with the correct polarity and in an electrically conductive manner to the associated DC voltage connection element, wherein always in the respective region of the connection between DC voltage terminal element and DC voltage connection element, wherein, optionally:
• the first and second DC voltage terminal element, as well as the first and second DC voltage connection element, form a stack with an insulation device in each case arranged between them,
• the first DC voltage terminal element has a first recess enclosed thereby, preferably completely, in a first main plane,
• the second DC voltage connection element has a second recess enclosed thereby, preferably completely, and aligned with the first in a third main plane,
• the second DC voltage terminal element and the first DC voltage connection element are arranged in a second main plane, arranged between the first and third main plane, and are laterally spaced apart from each other in the region of the recesses.

According to another aspect of the present invention, in this arrangement a clamping device extends in an electrically isolated manner through the first and second recess, thus forming an electrically conducting clamped connection between the first DC voltage terminal element and the first DC voltage connection element, and between the second DC voltage terminal element and the second DC voltage connection element, wherein the respective potentials, those of the first DC voltage elements from those of the second DC voltage elements, are electrically insulated from each other.

According to another aspect of the present invention, it is particularly advantageous if the clamping device is implemented with one, particularly preferably exactly one, clamping element, preferably designed as a through bolt, and with a spring device. It is also advantageous if the clamping device, in particular the bolt, extends through a third recess, aligned with the first and second, of the housing and is anchored, in particular bolted, in a base plate, which is designed in particular as a cooling device. In particular, the clamping device can have a sleeve made from insulating material, through which the clamping element passes.

According to another aspect of the present invention, it is particularly advantageous if the insulation devices of the two stacks mutually overlap in the region of the recesses, and in this overlap region form a further common recess aligned with the other recesses.

According to another aspect of the present invention the housing is preferably made from a material from the material group of the high-temperature-resistant plastics, in particular polyphenylene sulphide or polybutylene terephthalate. It is also preferable that the DC voltage terminal elements, and preferably also the DC voltage connection elements, are implemented as a metal film or metal sheet, with a thickness of preferably 300 λm to 2000 μm, particularly preferably of 500 μm to 1500 μm. It is further preferable that the respective insulation device is made of a material from the material group of the plastics with high electrical dielectric strength, in particular from polyimide, ethylene tetrafluoroethylene copolymer or liquid crystal polymer, with a thickness of preferably 50 μm to 500 μm, particularly preferably of 75 μm to 150 μm.

According to another aspect of the present invention the DC voltage connecting elements preferably form the DC voltage supply of the power converter module.

According to another aspect of the present invention, in a particularly advantageous design, the housing has a first coupling device with a first supporting surface for the first DC voltage terminal element. The second DC voltage connection element is arranged in a second coupling device, which is preferably part of a capacitor device. The two coupling devices are interleaved in such a way that without further adjustment, the DC voltage terminal elements and the DC voltage connection elements are positioned in relation to each other. The respective coupling devices preferably have track elements and stop elements for this purpose. A particularly simple low-inductance assembly and electrically conductive connection of DC voltage terminal elements and DC voltage connection elements can therefore be implemented.

Of course, unless this is either inherently or explicitly excluded herein below, the features mentioned in the singular, in particular the power converter module, may also be present in a plurality in the arrangement according to the invention.

As will be understood by one of skill in the art after full review and understanding of the enclosed, that the various embodiments of the invention can be implemented either individually or in any combination, in order to achieve improvements. In particular, the above features and those mentioned below can be applied not only in the specified combinations, but also in other combinations or in isolation, without departing from the scope and spirit of the present invention.

According to one aspect of the present invention, there is provided a power electronic arrangement, comprising: a power converter module (2), that further comprises a switching device (4) with a substrate with a first and a second DC voltage conductor track (42, 48); said switching device having a first and a second DC voltage terminal element (50, 52) connected to said first and said second DC voltage conductor tracks (42, 48) in an electrically conductive manner with an operable polarity; a housing (20) and a first and a second DC voltage connection element (60, 62); each respective said first and said second DC voltage connection element (60, 62) in connection with an operable polarity and in an electrically conductive manner to respective said first and said second DC voltage terminal element (50, 52); a region proximate each said connection between respective said first and said second DC voltage terminal elements and respective said first and second DC voltage connection elements forms a stack arrangement; at least one insulation device (54, 64) is arranged in each respective stack arrangement between said first and said second DC voltage terminal elements and respective said first and second DC voltage connection elements; said first DC voltage terminal element (50) has a first recess (500) enclosed in a first main plane (HE1); said second DC voltage connection element (62) has a second recess (620) enclosed and aligned with the first main plane in a third main plane (HE3); said second DC voltage terminal element (52) and said first DC voltage connection element (60) aligned in a second main plane (HE2), arranged between said first and said third main plane (HE1, HE3), and laterally spaced apart from each other in a region proximate said first and said second recess (500, 620); and a clamping device (7) extends in an electrically isolated manner through said first and said second recess (500, 620) and secures respectively an electrically conducting clamped connection between said first DC voltage terminal element (50) an d said first DC voltage connection element (60), and between said second DC voltage terminal element (52) and said second DC voltage connection element (62).

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
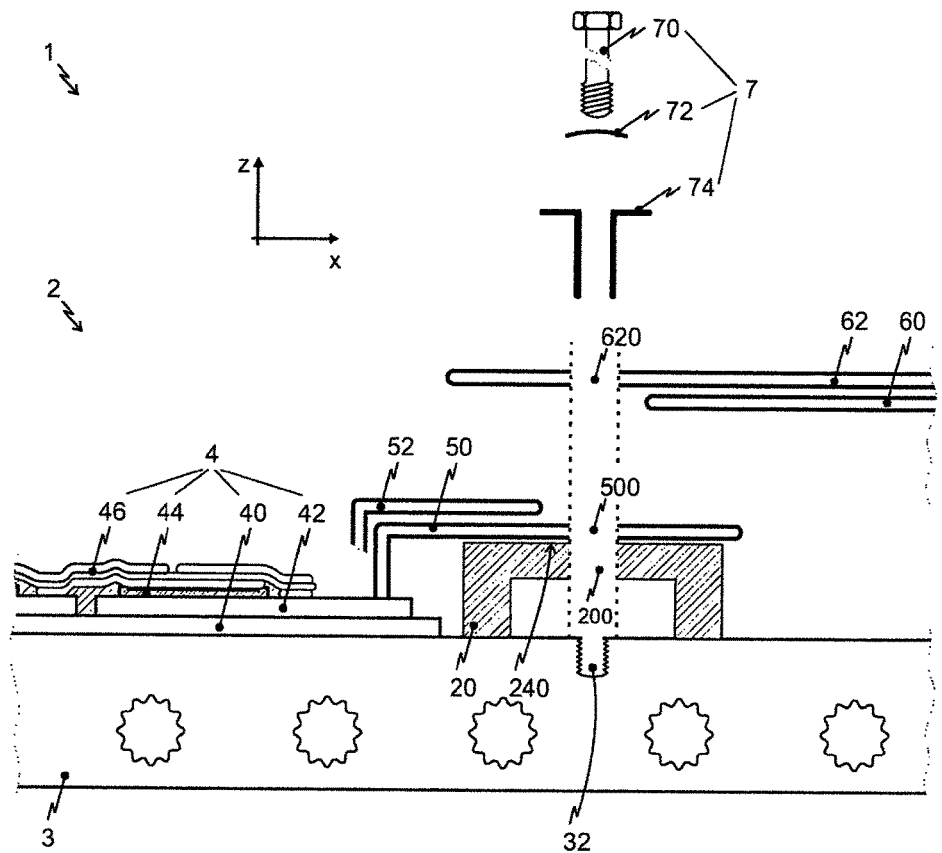
FIG. 1 shows a detail of a partially exploded view of a first power electronic arrangement in a sectional view.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

In the present text, numerous specific details are set forth in order to provide a thorough understanding of exemplary versions of the present invention. It will be apparent, however, to one skilled in the art, that some versions of the present invention may possibly be practiced without some of these specific details. Indeed, reference in this specification to "a variant," "variants," and "one/the variant," or "one version," "a version" and the like, should be understood to mean that a particular feature, structure, or characteristic described in connection with the variant or version is included in at least one such variant or version according to the disclosure. Thus, the appearances of phrases such as "in one variant," "in one version," and the like, in various places in the specification are not necessarily all referring to the same version or variant, nor are separate or alternative versions or variants mutually exclusive of other versions or variants. Moreover, various features may be described which possibly may be exhibited by some variants or versions and not by others. Similarly, various requirements are described which may be requirements for some variants or versions, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Various operations may be described as multiple discrete operations in turn, in a manner that may be helpful in understanding embodiments of the present invention; however, the order of description should not be construed to imply that these operations are order dependent.

Figure 2:
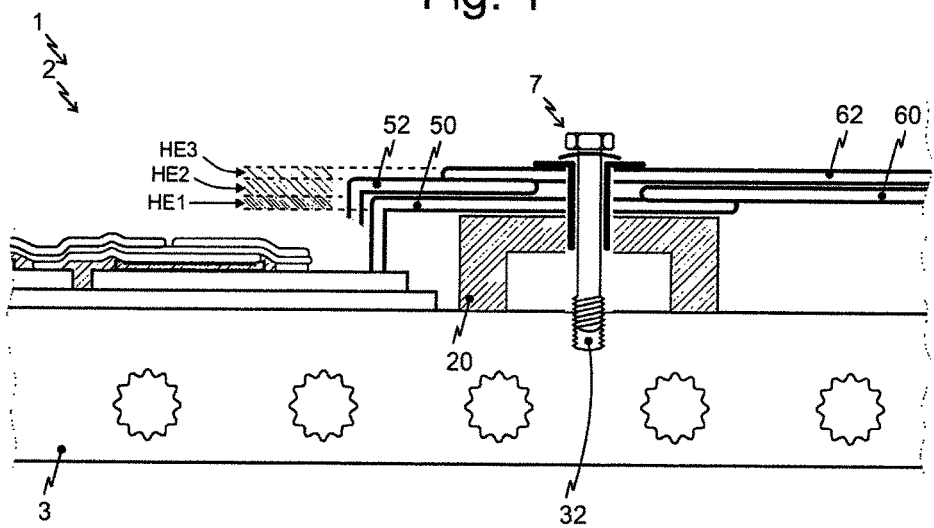
FIG. 2 shows the first power electronic arrangement in the assembled condition.
Figure 3:
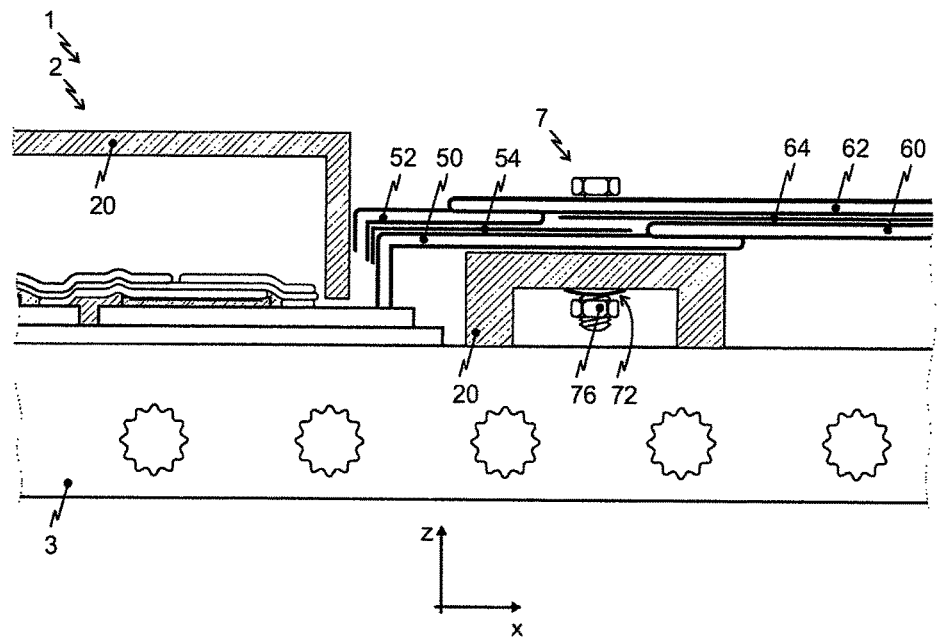
FIG. 3 shows a section of a second power electronic arrangement in a sectional view.

Common to the first and second design of the power electronic arrangement according to the invention 1 in accordance with FIGS. 1 to 3 is a power converter module 2, which has a switching device 4 that is arranged on a metal base plate 3, which is here designed as a liquid cooling device. To provide electrical insulation from the liquid cooling device 3 and thermal coupling to the liquid cooling device 3, this switching device has an insulating material body 40, implemented as a ceramic body. On the side facing away from the liquid cooling device 3 this ceramic body 40 has a multiplicity of conductor tracks 42, which in the operation of the switching device have different potentials. One of these conductor tracks 42, a first DC voltage conductor track, has a first DC voltage potential, while a further, second DC voltage conductor track, has a second DC voltage potential. As an example, the switching device forms a power converter circuit.

On at least one of these conductor tracks 42, which together with the insulating material body 40 form the substrate of the switching device, power semiconductor devices 44 are arranged in a standard manner to form a circuit. The connection in this embodiment is implemented as a standard film composite 46 made from electrically conductive and electrically insulating films stacked alternately.

For external connection, the power converter module 2 has two DC voltage terminal elements 50, 52, which are each connected in an electrically conducting manner to one of the DC voltage conductor tracks 42 carrying DC voltage potential. This connection is implemented in a standard way, in this case without restriction of generality, as a solder joint.

Figure 6:
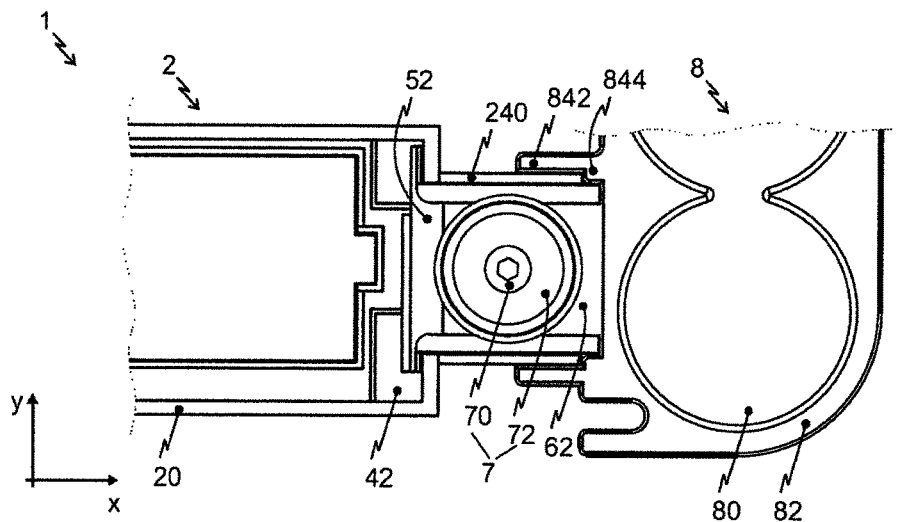
FIG. 6 shows a plan view of the third power electronic arrangement as noted in FIGS. 4 and 5.

These DC voltage terminal elements 50, 52 are used for the connection to associated DC voltage connection elements 60, 62, which are preferably connected to a capacitor device (see FIG. 6).

In the area of the connection, implemented by means of a clamping device 7, between the DC voltage terminal elements 50, 52 and DC voltage connection elements 60, 62, the first DC voltage terminal element 50 and the second DC voltage terminal element 52 form a stack, wherein between the two DC voltage connection elements 50, 52, and shown only in FIG. 3, an insulation device 54 is arranged. The first DC voltage terminal element 50 rests on a supporting surface 240 of a housing 20, only partially shown, of the power converter module 2. This housing 20 in this design is only implemented as part of a housing, and thus does not completely enclose the switching device 4, as would be possible and also common practice.

The housing 20 of the power converter module 2 here is formed from a high-temperature-resistant plastic, here a polyphenylene sulphide, which also has a high flexural strength. The DC voltage terminal elements 50, 52, as well as the DC voltage connection elements 60, 62, are implemented as thin metal sheets, here more precisely copper sheets, with a thickness of 700 µm. The insulation device 54, 64, both between the DC voltage terminal elements 50, 52 and between the DC voltage connection elements 60, 62, is made from a plastic with high electrical breakdown strength, here from ethylene tetrafluoroethylene copolymer or liquid crystal polymer, with a thickness of 100 µm.

FIG. 1 shows a detail of the first power electronic arrangement 1 in a sectional view, wherein the section extends in a plane which also contains the clamping device 7. In addition to the above-mentioned features the clamping device 7 and the DC voltage connecting elements 60, 62 are here shown in an exploded view, while FIG. 2 shows the first power electronic arrangement 1 in the assembled condition.

In the area of the connection between the DC voltage terminal elements 50, 52 and DC voltage connection elements 60, 62, as described, the first DC voltage terminal element 50 rests on a supporting surface 240 of the housing 20 and has a first recess 500, which is completely enclosed by the DC voltage terminal element 50. In other words, the first recess 500 forms a through hole, see also FIG. 4, in the first DC voltage terminal element 50. In this sectional view the contact area, see FIG. 4 again, of the first DC voltage terminal element 50 in which the electrically conducting contact is made with the first DC voltage connection element 60, lies on the far side of the first recess 500, seen in a lateral view from the substrate. In the area of the connection the extent of the first DC voltage terminal element 50 defines a first main plane HE1.

Figure 4:
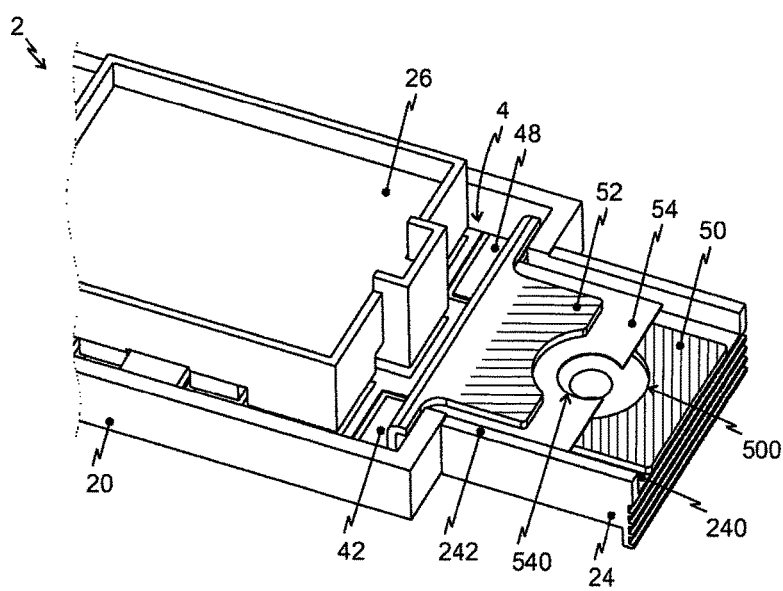
FIGS. 4 and 5 show two components of a third power electronic arrangement in a three-dimensional view.

The second DC voltage terminal element 52 is recessed relative to the first, as a result of which its contact area, see FIG. 4, to the second DC voltage connection element 62 in a lateral view from the substrate, lies on this side of the first recess 500. In the area of the connection the extent of the second DC voltage terminal element 52 defines a second main plane HE2 directly following the first in the direction away from the cooling device, thus in the positive z-direction.

Figure 5:
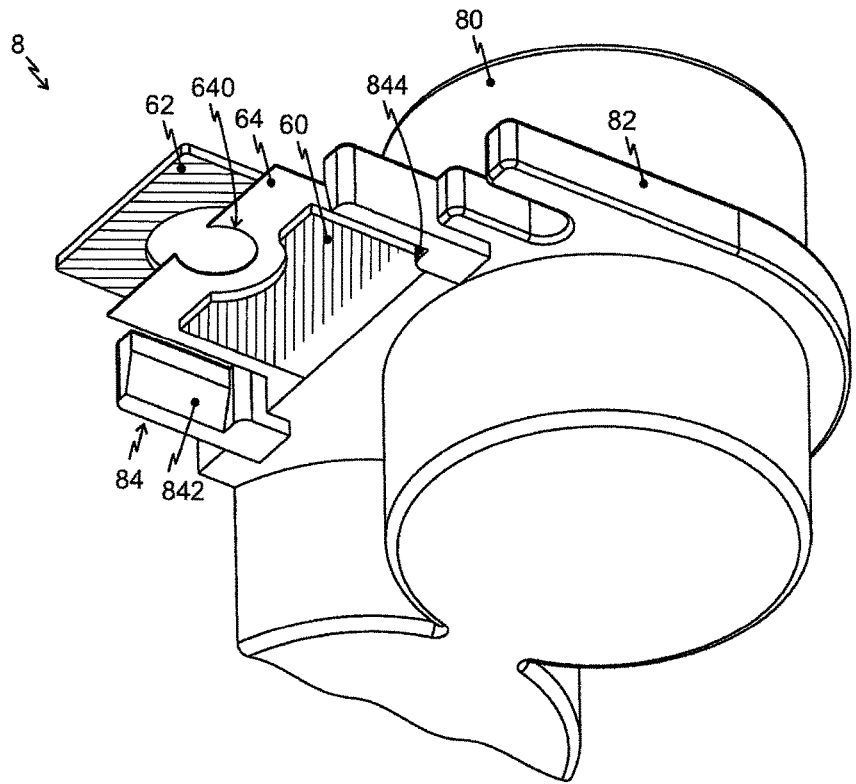

The respective contact areas of the DC voltage terminal elements 50, 52 are located on the opposite sides of the cooling device 3 (see FIG. 4), while the respective contact areas of the DC voltage connection element 60, 62 are on the side facing the cooling device 3 in each case (see FIG. 5). Of course, in the context of an alternative design this entire configuration can also be designed in mirror image.

In the second main plane HE2 viewed laterally from the substrate, thus in the positive x-direction, the first DC voltage connection element 60 is spaced apart from the second DC voltage terminal element 52, and is thus electrically conductively connected to the contact area of the first DC voltage terminal element 50.

The second DC voltage connection element 62 is arranged in a third main plane HE3 in the z-direction directly adjoining the second main plane HE2. This second DC voltage connection element 62 is in electrically conductive contact with the second DC voltage terminal element 52 and specifically, with the contact surface thereof described above. The second DC voltage connection element 62 has a second recess 620, which is designed in essentially the same manner as the first recess 500 of the first DC voltage terminal element 50, see FIG. 5. This second recess 620 is arranged in the z-direction in alignment with the first recess 500.

Furthermore, in the area of its first supporting surface 240 the housing 20 has a third recess 200 aligned with the first and second, and thus also in the z-direction. In all of these recesses 200, 500, 620 an insulating material sleeve 74 is arranged, which provides electrical insulation, including any necessary air and creepage gaps, of the respective potentials. In this sleeve 74 a bolt 70 is arranged, which together with a spring device 72, here implemented as a Belleville spring washer, forms the electrically conductive clamping connection between the first DC voltage terminal element 50 and the first DC voltage connection element 60 and, at the same time, between the second DC voltage terminal element 52 and the second DC voltage connection element 62. For this purpose, the screw 70 is simply screwed into an internally threaded blind hole 32 of the cooling device 3.

These components here form the clamping device 7 of the arrangement. This design is advantageous in many different ways. Firstly, the arrangement of the DC voltage connection elements 60, 62 with respect to the DC voltage terminal elements 50, 52 is simple from a production engineering point of view, because the stacked DC voltage connection elements 60, 62 are in a way simply placed on the DC voltage terminal elements 50, 52, which are also stacked, and the correct-polarity electrical connections are formed with a single screw connection. A second major advantage here is the attachment to the cooling device 3, which forms an excellent strain relief for the DC voltage connection elements 60, 62. In other words, this design prevents the action of any forces on the substrate. In addition, the electrically conductive connection formed has particularly low inductance.

FIG. 3 shows a detail of a second power electronic arrangement 1 in a sectional view, wherein the section extends in a plane which also contains the clamping device 7.

For an explanation of the design, including those of FIGS. 1 and 2, the insulation devices 54, 64 are explicitly shown here. This insulation devices 54, 64 of the two stacks overlap each other in the area in which the second DC voltage terminal element 52 is laterally spaced apart from the first DC voltage connection element 60. This region is at the same time essentially identical to the region of the insulation devices 54, 64, which is aligned with the first and second recess 500, 620. The insulation devices 54, 64 overlap, see FIGS. 4 and 5, in this overlap region and form a further common recess, see FIGS. 4 and 5, aligned flush with the other recesses 500, 620.

In contrast to the first design, in accordance with FIGS. 1 and 2, the clamping device 7 here is not anchored in the cooling device 3. Instead, the housing 3 has a threaded nut 76 in a pocket and also the spring device 72, to which the bolt 70 is screwed. This allows greater freedom in the design of the cooling device, or more generally the base plate, while maintaining an effective strain relief by means of the clamping device 7.

Given a suitable design of the first recess, thus with an adequately dimensioned diameter of this recess, matched to the operating voltage of the power converter and necessary due to the insulation requirements, a separate insulating material sleeve as shown in FIGS. 1 and 2 may be dispensed with.

FIGS. 4 and 5 show two components of a third power electronic arrangement 1 in a three-dimensional view, while FIG. 6 shows a plan view of this third power electronic arrangement. This design is in principle the same as the first one shown in FIGS. 1 and 2, but is shown with more constructional details than the FIGS. 1 and 2, which outline the structure in a highly abstract way. FIG. 4 shows a housing 20 of the power converter module 2, which encloses the switching device 4 but does not cover it. The switching device 4 is essentially covered by a pressure device 26, which presses the substrate onto a cooling device, not shown, in order to produce a thermally conductive connection.

The housing 20 has a first coupling device 24, which has a first supporting surface 240, on which the first DC voltage terminal element 50 rests in an end section. The contact area of this first DC voltage terminal element 50 with a first DC voltage connection element shown in FIG. 5, is here shown hatched. The first DC voltage terminal element 50 additionally has a first recess 500. The housing 20 has a third recess, aligned flush with this first recess 500. Both recesses are designed so as to receive a clamping device in the form of an insulating sleeve with a screw 70 passing through them, see FIG. 6.

Directly on the first DC voltage terminal element 50 and forming a stack therewith above the first supporting surface 240, an insulation device 54 and a second DC voltage terminal element 52 are arranged. This second DC voltage terminal element 52 has its own contact surface, shown hatched, to a second DC voltage connection element, see FIG. 5. The end section of the insulation device 54 is recessed in relation to the end section of the first DC voltage terminal element 50 in the direction of the substrate. In addition, the end section of the second DC voltage terminal element 52 is recessed in the same direction in relation to that of the insulation device 54. The end sections thus form steps. The insulation device 54 also has a further recess 540, which is also aligned flush with the first and third recess.

A capacitor device 8 is shown in FIG. 5, which has a frame element 82 for supporting a plurality of capacitors 80 and which forms the DC voltage supply of the power converter module. This frame element 82 has a second coupling device 84, which in this design is formed integrally with the frame element. The second DC voltage connection element 62 is arranged and fixed in this second coupling device 84. The second DC voltage connection element 62 has a second recess 620 which is aligned flush with the first and third recess and is also designed to accommodate the clamping device described above.

The second DC voltage connection element 62 forms a stack with an insulation device 64 and a first DC voltage connection element 60, which corresponds to the stack of the DC voltage terminal elements. By arrangement, which in production engineering terms is effected simply by placement, of the capacitor device 8 in relation to the power converter module 2 in such a way that the first, second and third recess are aligned with each other and arrangement of the clamping device, an electrically conductive clamping connection is formed between the first DC voltage terminal element and the first DC voltage connection element, and between the second DC voltage terminal element and the second DC voltage connection element. As a result, contact surfaces shown with the same hatching then come to rest against each other. This is shown in plan view in FIG. 6. For positioning purposes, the housing 20 has first track elements 242 and the capacitor device 8 has second track elements 842 as well as stop elements 844.

During this positioning, respective end sections of the insulation device come to rest on each other with their other recesses 540, 640 overlapping, wherein their respective recesses form a further common recess, which of course is aligned with the first, second, and third in order to receive the clamping device.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A power electronic arrangement, comprising:
   a power converter module, that further comprises a switching device with a substrate with a first and a second DC voltage conductor track;
   said switching device having a first and a second DC voltage terminal element connected to said first and said second DC voltage conductor tracks in an electrically conductive manner with an operable polarity;
   a housing and a first and a second DC voltage connection element;
   each respective said first and said second DC voltage connection element in connection with an operable polarity and in an electrically conductive manner to respective said first and said second DC voltage terminal element;
   a region proximate each said connection between respective said first and said second DC voltage terminal elements and respective said first and second DC voltage connection elements forms a stack arrangement;
   at least one insulation device is arranged in each respective stack arrangement between said first and said second DC voltage terminal elements and respective said first and second DC voltage connection elements;
   said first DC voltage terminal element has a first recess enclosed in a first main plane;
   said second DC voltage connection element has a second recess enclosed and aligned with the first main plane in a third main plane;
   said second DC voltage terminal element and said first DC voltage connection element aligned in a second main plane, arranged between said first and said third main plane, and laterally spaced apart from each other in a region proximate said first and said second recess; and
   a clamping device extends in an electrically isolated manner through said first and said second recess and secures respectively an electrically conducting clamped connection between said first DC voltage terminal element and said first DC voltage connection element, and between said second DC voltage terminal element and said second DC voltage connection element.

2. The power electronic arrangement, according to claim 1, wherein:
   the clamping device further comprises:
      a clamping element;
      said clamping element including a bolt portion and spring portion.

3. The power electronic arrangement, according to claim 2, wherein:
   said bolt, extends through a third recess in said housing;
   said third recess aligned with said first recess and said second recess;
   said power electronic arrangement further comprising:
      a base plate including an anchoring recess aligned with and receiving an anchoring end of said bolt; and
      said base plate operative as a cooling device for said power electronic arrangement.

4. The power electronic arrangement, according to claim 2, further comprising:
   a sleeve of insulating material bounding a sleeved opening in said clamping device; and
   said claiming element passing through said sleeved opening of said sleeve.

5. The power electronic arrangement, according to claim 4, wherein:
   said at least one insulation device includes at least a first insulation device and a second insulation device;
   each said first insulation device in a respective first stack having a first recess and each said second insulation device in a respective second stack having a second recess;
   said first recess and said second recess being in alignment and respectively forming a common recess in a common alignment;
   each said first and said second insulation device in each respective first and second stack overlapping proximate each respective first recess and said second recess.

6. The power electronic arrangement, according to claim 5, wherein:
   said the housing is made from a material from the material selected from a group of materials consisting of: a high-temperature-resistant plastic, a polyphenylene sulphide, and a polybutylene terephthalate.

7. The power electronic arrangement, according to claim 5, wherein:
   each said first and said second DC voltage terminal element being formed of a metal sheet; and
   said metal sheet having a thickness between 300 μm to 2000 μm.

8. The power electronic arrangement, according to claim 5, wherein:
   said at least one insulation device being a plastic material with a high electrical breakdown strength;
   said plastic material including a plastic material selected from the group consisting of: a polyimide, an ethylene tetrafluoroethylene copolymer, a liquid crystal polymer; and
   said plastic material having a thickness between 50 μm to 500 μm.

9. The power electronic arrangement, according to claim 5, wherein:
   said DC voltage connection element forms the DC voltage supply of the power converter module.

10. The power electronic arrangement, according to claim 5, wherein:
    the housing further comprises:
       a first coupling device with a first supporting surface for the first DC voltage terminal element;
    wherein the second DC voltage connection element is arranged in a second coupling device; and
    said second coupling device linked with a capacitor device.

11. The power electronic arrangement, according to claim 10, wherein:
    each said coupling device is respectively interleaved and respectively positions each said DC voltage terminal elements and respective said DC voltage connection elements in an interleaved arrangement.

12. The power electronic arrangement, according to claim 10, wherein:
    each respective said first coupling device, further comprises a first track element and a stop element; and
    each respective said second coupling device, further comprises a second track element and a stop element.

* * * * *